United States Patent
Orihara (10) Patent No.: US 7,233,338 B2
(45) Date of Patent: Jun. 19, 2007

(54) COMPUTER PROGRAM PRODUCT AND COMPUTER SYSTEM

(75) Inventor: Jun Orihara, Tokyo (JP)

(73) Assignee: Kabushiki Kaisha Sega, Tokyo (JP)

(*) Notice: Subject to any disclaimer, the term of this patent is extended or adjusted under 35 U.S.C. 154(b) by 293 days.

(21) Appl. No.: 10/663,754

(22) Filed: Sep. 17, 2003

(65) Prior Publication Data

US 2004/0128621 A1   Jul. 1, 2004

(30) Foreign Application Priority Data

Sep. 19, 2002   (JP) .............................. 2002-273522

(51) Int. Cl.
G09G 5/02   (2006.01)
(52) U.S. Cl. ...................... 345/593; 345/594
(58) Field of Classification Search ........ 345/589–605, 345/619, 624, 646, 473–475, 642
See application file for complete search history.

(56) References Cited

U.S. PATENT DOCUMENTS

2001/0034255 A1* 10/2001 Hayama et al. ................. 463/1
2001/0053246 A1* 12/2001 Tachibana et al. ........... 382/162
2004/0169659 A1*  9/2004 Kagawa et al. .............. 345/600

OTHER PUBLICATIONS

Notice of Reasons for Refusal from the Japanese Patent Office, mailed Jun. 29, 2006, in Japanese Patent Application No. 2002-273522.

English Language Translation of Notice of Reasons for Refusal.
"Konami Official Guide Perfect Series, J. League 1999-Live-, Perfect Striker, Perfect Guide, First Edition," Konami Corporation, Jan. 12, 2000. First Edition, p. 196.
Konami Perfect master Series (84), World Soccer Winning Eleven 6, Master League Ultimate Bible, First Edition, Konami Corporation, May 25, 2002, First Edition, p. 35.
"Konami Official Guide Perfect Series, World Soccer 2001 -Live-, Perfect Guide, First Edition," Konami Corporation, Dec. 15, 2001, First Edition, p. 9.
"Konami Official Guide Perfect Series, World Soccer 2000 -Live-, Perfect Guide, First Edition," Konami Corporation, Dec. 17, 2000, First Edition, p. 172.

* cited by examiner

Primary Examiner—Kee M. Tung
Assistant Examiner—Aaron M Richer
(74) Attorney, Agent, or Firm—Finnegan, Henderson, Farabow, Garrett & Dunner, L.L.P.

(57) ABSTRACT

The object of the present invention is to generate automatically a color design for a display object to be displayed on a computer graphics screen. In order to achieve this object, the computer program product of the present invention is a computer program product wherein a computer program for causing a computer system to execute processing for automatically generating a color design for a display object to be displayed on a screen is recorded on a computer-readable recording medium, the computer program implementing: an input step of receiving specification of colors constituting a first color design for the display object; a converting step of converting the colors specified at the input step to other colors, in accordance with a previously determined color converting rule; and a step of creating an association for the colors obtained in the converting step, as colors constituting a second color design for the display object.

10 Claims, 4 Drawing Sheets

15 COLOR PALETTE

| | | | | |
|---|---|---|---|---|
| WHITE C1 | | | | GROUP A |
| | CYAN C2 | YELLOW C3 | | GROUP B |
| GREEN C4 | ORANGE C5 | | | GROUP C |
| | RED C6 | PURPLE C7 | | GROUP D |
| DARK GREEN C8 | | BLUE C9 | | GROUP E |
| | DARK RED C10 | ULTRAMARINE C11 | BLACK C12 | GROUP F |

FIG.3

16 HOME COLORS TYPE JUDGEMENT TABLE

| HOME COLORS TYPE | MAIN COLOR | SECOND COLOR | THIRD COLOR |
|---|---|---|---|
| 1 | AB | AB | AB |
| 2 | AB | AB | CD |
| 3 | AB | AB | EF |
| 4 | AB | CD | EF |
| 5 | AB | EF | CD |
| 6 | AB | CD | AB |
| 7 | AB | EF | AB |
| 8 | AB | CD | CD |
| 9 | AB | EF | EF |
| 10 | CD | CD | CD |
| 11 | CD | CD | AB |
| 12 | CD | CD | EF |
| 13 | CD | AB | EF |
| 14 | CD | EF | AB |
| 15 | CD | AB | CD |
| 16 | CD | EF | CD |
| 17 | CD | AB | AB |
| 18 | CD | EF | EF |
| 19 | EF | EF | EF |
| 20 | EF | EF | AB |
| 21 | EF | EF | CD |
| 22 | EF | AB | CD |
| 23 | EF | CD | AB |
| 24 | EF | AB | EF |
| 25 | EF | CD | EF |
| 26 | EF | AB | AB |
| 27 | EF | CD | CD |

FIG.4

17 AWAY COLORS TYPE JUDGEMENT TABLE

| AWAY COLORS TYPE | MAIN COLOR | SECOND COLOR | THIRD COLOR | HOME COLORS FROM WHICH COLOR CONVERSION IS POSSIBLE |
|---|---|---|---|---|
| A | D1($\alpha$) | D1($\beta$) | $\alpha$ | 4·8~14·17·18·23·27 |
| B | D1($\alpha$) | D1($\beta$) | $\beta$ | 4·6·8·10·11·12·23·25·27 |
| C | D1($\alpha$) | D1($\beta$) | $\gamma$ | 2·5·8·10·15·16·21·22·27 |
| D | D1($\alpha$) | D3($\beta$) | D2($\alpha$) | ALL OK |
| E | D1($\alpha$) | D5($\beta$) | $\gamma$ | ALL OK |
| F | D1($\alpha$) | D4($\alpha$) | $\alpha$ | 6~9·15~18·24~27 |
| G | D1($\alpha$) | D4($\alpha$) | $\beta$ | 6~9·15~18·24~27 |
| H | D1($\alpha$) | $\gamma$ | D1($\alpha$) | ALL OK |
| I | D1($\alpha$) | D1($\beta$) | D1($\gamma$) | 10~8 |
| J | $\gamma$ | $\gamma$ | $\alpha$ | 2~5·11~14·20~23 |
| K | $\gamma$ | D1($\alpha$) | $\alpha$ | 2~5·11~14·20~23 |
| L | $\gamma$ | D1($\alpha$) | $\beta$ | 2~5·11~14·20~23 |
| M | D2($\alpha$) | D2($\beta$) | D2($\gamma$) | ALL OK |
| N | D3($\alpha$) | D3($\beta$) | D3($\gamma$) | ALL OK |
| O | D4($\alpha$) | D1($\beta$) | D4($\gamma$) | ALL OK |
| P | D5($\alpha$) | D5($\beta$) | D5($\gamma$) | ALL OK |

COMPUTER PROGRAM PRODUCT AND COMPUTER SYSTEM

BACKGROUND OF THE INVENTION

1. Field of the Invention

The present invention relates to color design generation technology for display images which are displayed on a computer graphics screen.

2. Description of the Related Art

As disclosed in Japanese Patent Laid-open No.2001-749, there is known a computer system which performs a soccer game, in a virtual fashion, in response to input operations performed by a user. In a conventional soccer game, the coloring of the uniform worn by the characters simulating soccer players is previously determined, and there has been no provision whereby a user can determine the design of the uniform, but with the contemporary demands in recent years for greater diversification of games and increased added value, system designs which reflect the individual personality of the user have been developed. For example, it is possible to play a soccer game using a team uniform of which the colors have been designed freely by the user, by providing a program which enables a uniform edit mode to be executed, separately from the basic game processing.

However, in actual soccer competitions, it is common for a color design to be implemented whereby there is a difference in coloring between the uniform that a team wears when playing at its home ground (home uniform) and the uniform that it wears when playing at an away ground (away uniform). This is because confusion will occur between the players, causing an obstruction to the playing of the game, if the respective opposing teams have similar color designs in their playing uniforms. Consequently, in a soccer game using a computer system also, similarly to an actual soccer competition, it is necessary to change between a color design for the home uniform and a color design for the away uniform, in such a manner that the respective teams can be told apart, visually.

Moreover, although it has been considered that a user should be able freely to design the home uniform and the away uniform, since the user is able to design the uniform freely, it can be envisaged that he or she may use a similar color scheme for both designs, thus giving rise to situations where a distinction cannot be made readily between the home uniform and the away uniform. Furthermore, if two teams having designs using similar types of color in this way play against each other, then it will not be possible to distinguish between them, even if one of the teams is changed to an away uniform.

Problems of this kind are not limited to soccer games, but may also occur in other games where the user is able freely to edit the color design of the game characters. For example, in addition to team sports such as a soccer match, this problem may also apply to competitive games in which characters compete with each other, role playing games in which characters have encounters inside a virtual space, and the like.

SUMMARY OF THE INVENTION

Therefore, it is an object of the present invention to provide technology for automatically generating color designs for display objects displayed on a screen.

In order to achieve the aforementioned object, the computer program product according to the present invention is a computer program product wherein a computer program for causing a computer system to execute processing for automatically generating a color design for a display object to be displayed on a screen is recorded on a computer-readable recording medium; said computer program implementing: an input step of receiving specification of colors constituting a first color design for said display object; a converting step of converting the colors specified at said input step to other colors, in accordance with a previously determined color converting rule; and a step of creating an association for the colors obtained in said converting step, as colors constituting a second color design for said display object.

According to the present invention, since a second color design is generated on the basis of colors converted in accordance with a previously determined color conversion rule from the colors constituting the first color design for the display object, it is possible to achieve a design wherein the first color design and the second color design are mutually different.

Here, a "display object" refers to an object which is displayed on a screen, and includes, for example, characters displayed on a game screen, other display objected displayed in relationship with same (for example, uniforms, emblems, flags, and the like), and also objects other than characters (buildings, roadways, vehicles, and the like).

Desirably, said computer program receives specification of at least two or more colors in said input step, and performs color conversion for each of the specified colors in said converting step.

By means of this composition, since it is possible to perform color conversion for each color specified at the input step, color designs having important variations can be achieved.

Desirably, said color conversion is achieved by means of color conversion factors associated with the combination of colors specified in said input step.

Since the color converting functions can be changed in accordance with the combination of color specified at the input step, then it is possible, for example, to construct a design concept for the second color design that is different from the design concept of the first color design.

Desirably, the colors constituting the color design for said display object comprise, at least, a combination of colors which are mutually complementary colors, and said color conversion functions comprise a function for setting, as an output value, a color having a complementary color relationship with respect to the color forming the input value.

By adopting, as colors constituting the second color design, colors which are complementary colors of the colors constituting the first color design, it is possible to achieve color designs which create mutually different color impressions.

Desirably, the colors constituting the color design for said display object comprise at least one of warm type colors and cold type colors, respectively, and said color conversion functions comprise a function for setting a cold type color as an output value if the color forming the input value is a warm type color, and for setting a warm type color as an output value if the color forming the input value is a cold type color.

By using warm type colors and cold type colors in a differentiated manner in the first color design and the second color design, it is possible to achieve color designs creating mutually different color impressions.

In this case, the function may be composed in such a manner that if the color forming the input value is a color of a warm type, then a color determined by a calculational process, or the like, from a group of cold type colors is set as an output value, and if the color forming the input value is a color of a cold type, then a color determined by a calculational process, or the like, from a group of warm type colors, is set as an output value. In other words, in the present invention, it is possible to constitute the function used for color conversion in such a manner that not only is an output value determined from an input value in accordance with a previously determined correspondence relationship, but also an output value is calculated by performing calculational processing on the basis of prescribed calculational formulae, or the like.

Desirably, the colors constituting the color design for said display object comprise, at least, a combination of colors which have different brightness, and said color conversion functions comprise a function for setting, as an output value, a color having inverted brightness of the color forming the input value.

By changing the brightness between the first color design and the second color design, it is possible to achieve color designs which create mutually different color impressions.

Desirably, said computer program further causes said computer system to execute: a step of automatically generating a plurality of types of color layout candidates for said second color design, and displaying same on a screen; and a step of determining a color layout for said second color design on the basis of specified one of said candidates.

By displaying candidates for a second color design automatically generated by the computer system on a screen, and determining the color layout of the second color design on the basis of a candidate specified by the operator, it is possible perform color design for the displayed object, readily.

Desirably, said computer program further causes said computer system to execute: a step of determining a color layout for a second display object to be displayed in association with said display object, on the basis of colors of the same type as the colors constituting the color design of said display object; and a step of displaying said second display object on a screen.

By means of this composition, it is possible to determine the color layout of a second display object to be displayed in association with the aforementioned display object, on the basis of the color design of this display object, and hence a design can be adopted wherein the design concepts of the display object and the second display object are the same.

Here, it is suitable to use, for the computer-readable recording medium, for example, an optical recording medium (a recording medium from which data can be read out optically, such as a CD-RAM, CD-ROM, DVD-RAM, DVD-ROM, DVD-R, PD disk, MD disk, MO disk, or the like,) a magnetic recording medium (a recording medium from which data can be read out magnetically, such as a flexible disk, magnetic card, magnetic tape, or the like), or a memory cartridge fitted with a memory element (a semiconductor memory element, such as a DRAM, a ferroelectric memory, such as an FRAM), or the like.

The computer system according to the present invention comprises: the computer program product according to the present invention; a CPU for executing the computer program stored on the computer program product; and an image generating device for displaying said screen on a display, on the basis of a color design for said display object generated by said CPU.

There are no particular limitations on a computer system of this kind, provided that it comprises a device capable of generating screen images, and, for example, a domestic game device, a commercial game device disposed in a gaming center, or the like, a portable telephone, PHS, PDA, or the like equipped with gaming functions, or the like, are appropriate.

The network server according to the present invention comprises delivery means for providing on-demand delivery, via a computer network, of the computer program stored on the computer program product according to the present invention, in response to a request from a client device.

Examples of appropriate devices for the client device are: a personal computer, a game device, or a portable information terminal, such as a portable telephone, PDA, palm type PC, or the like, equipped with a Web browser. Moreover, an open network, such as an Internet network, packet communications network, or the like, are appropriate for the computer network.

DESCRIPTION OF THE PREFERRED EMBODIMENTS

Below, the present embodiment is described with reference to the drawings.

Figure 1:
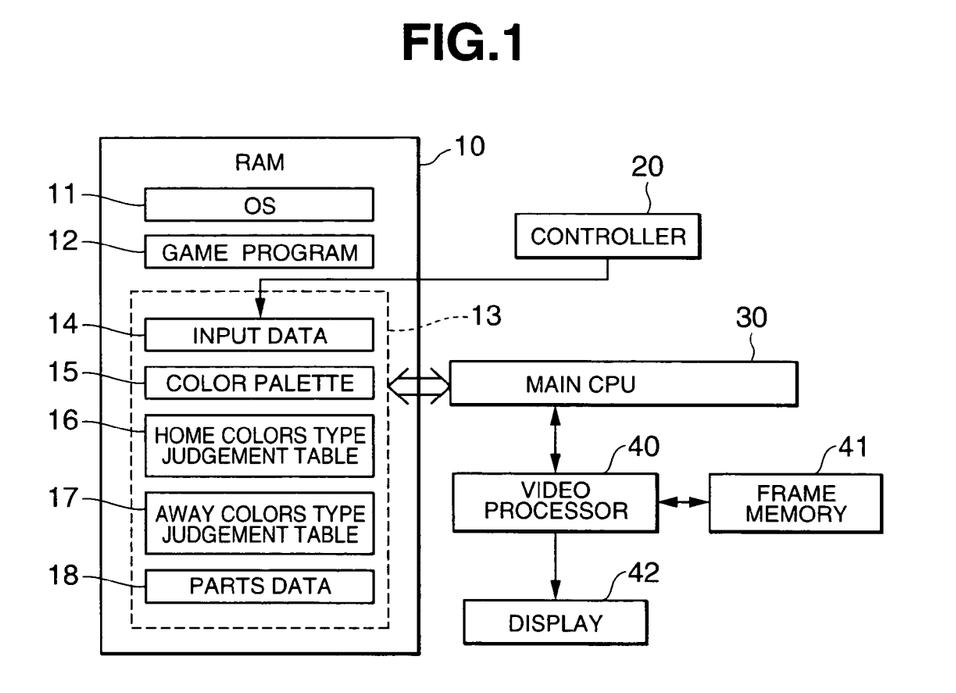
FIG. 1 is a compositional view of a computer system relating to the present invention.

FIG. 1 is a functional block diagram of a computer system comprising a color design automatic generation function for characters relating to the present embodiment. This system comprises a random access memory 10 which functions as a working memory, a controller 20 for serially outputting key inputs made by the user, in the form of electrical signals, a main CPU 30 which performs automatic color design generation for characters, as well as carrying out game processing, a video processor 40 which generates computer graphics data for displaying on a display 42, and a frame memory 41 which functions as a one frame drawing memory for the processor 40.

The random access memory 10 functions as a storing means for storing an operating system 11 required to operate the system, and a game program 12, and a work area 13 is set up to buffer the input data 14 from the user, and to store temporarily data of various kinds used in automatic character generation (such as a color palette 15, home colors type judgement table 16, away colors type judgement table 17, parts data 18, and the like). When the system is started up, the operating system 11, game program 12, color palette 15, home colors type judgement table 16, away colors type judgement table 17, parts data 18, and the like, are loaded from a read only memory (not illustrated), and written to the work area 13. Details of these various types of data are described below. The video processor 40 writes image data for one frame to the frame memory 41, in accordance with a drawing command supplied by the main CPU 30, in addition to which, the image data written for the previous frame is read out from the frame memory 41, by a double buffering operation, converted from digital to analogue, and displayed as a computer graphics image on the display 42. When editing the color design of the characters, the video processor 40 functions as edit screen generating means.

Figure 2:
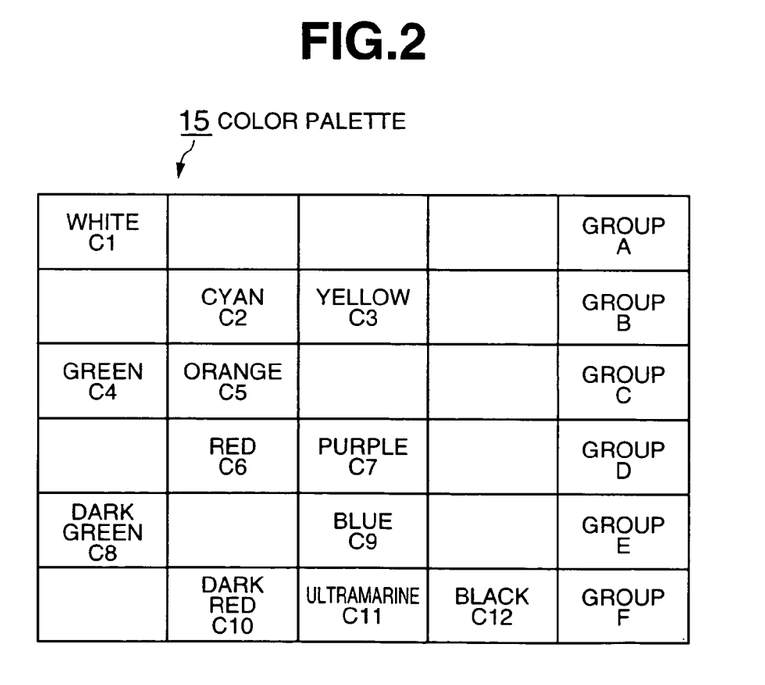
FIG. 2 is an illustrative diagram of a color palette used in generating a color design according to the present embodiment.

FIG. 2 is an illustrative diagram of a color palette 15 wherein the colors forming the basis of the color design of a display object to be displayed on the computer graphics screen (hereinafter, called the "base colors") are laid out. Provided that mutually different color spectra are selected, there are no particular limitations on the conditions for selecting the base colors, but desirably conditions are set in such a manner that, for any particular base color, at least a color having a complementary color relationship with respect to that base color is selected. By selecting a combination of base colors which are mutually complementary colors, it is possible to enable striking color designs of strong contrast. For example, if the main color of the home uniform is taken as C1, then by setting the main color of the away uniform to be a color C2 which is diagonally opposite the color C1 on the color circle (C2 thus being a complementary color of color C1), it is possible to achieve contrasting and complementary uniform designs. Moreover, there may also be cases involving combinations of three colors having even color differences, which are positioned at equal distances apart on the color circle. By selecting a combination of colors having even color differences, it is possible to create a visual sensation of tension. Moreover, desirably, the selection conditions for the base colors are determined in such a manner that the number of colors of a "warm" type and the number of colors of a "cold" type are approximately equal in the colors selected as base colors. Warm colors, such as red and orange, convey an image of well-being, energy, and the like, whereas cold colors, such as blue and green, convey contrasting images of coolness, calm, leisure, and the like. Furthermore, desirably, selection conditions for the base color are determined in such a manner that combinations of colors having different brightness, such as black and white, are included. Moreover, by combining colors of different brightness, it is possible to obtain a color combination having a high achromatic contrast.

However, combinations of colors which are mutually adjacent in the color circle, such as red and yellow, or selections of similar color shades to a particular base color, are not rejected, and furthermore, neither is it essential for there to exist a combination of complementary colors, and the selection conditions for the base colors are taken to be satisfied even in cases where there does not exist a combination of complementary colors. Here, as shown in the diagram, twelve base colors are selected, namely, white C1, cyan C2, yellow C3, green C4, orange C5, red C6, purple C7, dark green C8, blue C9, dark red C10, ultramarine C11, and black C12. If these twelve colors are to be classified into six groups, then white C1 belongs to group A, cyan C2 and yellow C3 to group B, green C4 and orange C5 to group C, red C6 and purple C7 to group D, green C8 and blue C9 to group E, dark red C10, ultramarine C11 and black C12 to group F.

Figure 5:
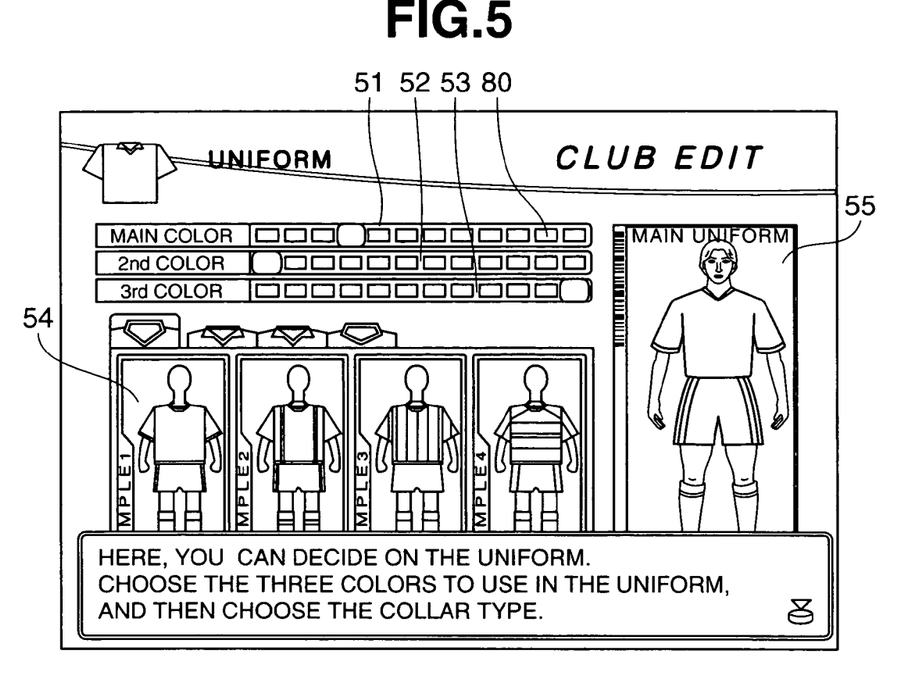
FIG. 5 shows a screen during editing of a home uniform according to the present embodiment.
Figure 6:
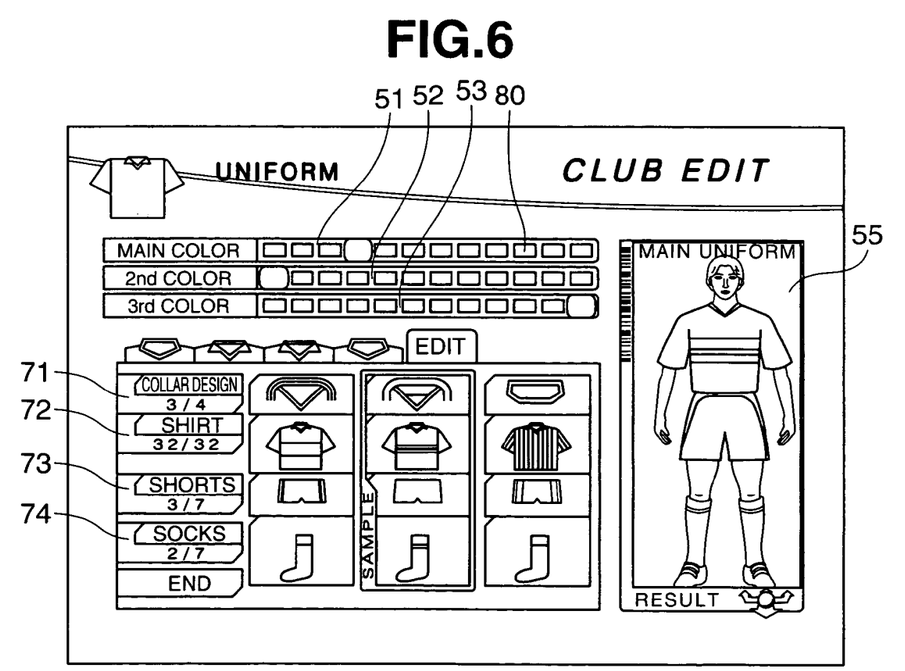
FIG. 6 shows a screen during editing of the basic style of the uniform according to the present embodiment.
Figure 7:
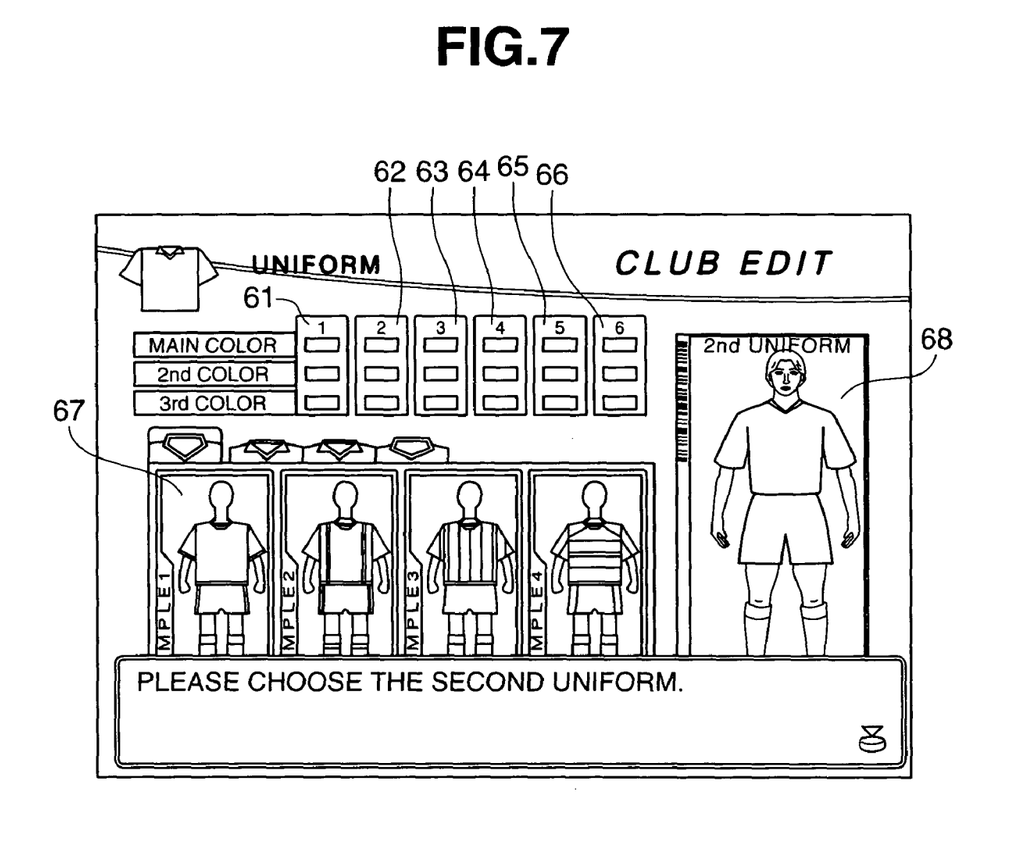
FIG. 7 shows a screen during editing of an away uniform according to the present embodiment.

FIG. 5 and FIG. 7 show one example of a screen for editing the color design of the uniform worn by soccer players forming characters on a game screen of a soccer game. Here, FIG. 5 is a screen for editing a home uniform, FIG. 6 is a screen for editing the basic style (the shape of the collar, length of the shorts, and the like) of the uniform, and FIG. 7 is a screen for editing the away uniform. As shown in FIG. 5, color bars 51–53 are displayed on the home uniform editing screen, in a position slightly above the center of the screen. In these color bars, twelve icons 80 each colored with one of the aforementioned base colors, are arranged in a row. Color bar 51 is used to determine the main color of the home uniform, and the color corresponding to the icon 80 selected by the user is established as the main color of the home uniform. Similarly, color bars 52 and 53 are bars for respectively selecting the second color and third color of the home uniform, the colors corresponding to the icons 80 selected thereon being established respectively as the second color and third color. Here, the "main color" indicates a color forming the basis (main subject) of the color design of the uniform, whilst the "second color" and "third color" are what may be termed supplementary colors, for marking accents in the color design. In general, the main color has a larger color surface area, followed by the second color and the third color, but this is not necessarily the case. Moreover, in the present specification, the main colors, second colors and third colors of the home uniform and the away uniform are collectively termed respectively as the "home colors" and "away colors".

Furthermore, as indicated in the diagram, a plurality of variations of the color design of the home uniform are displayed in a window 54. Here, four variations are shown. Each of the variations uses as a main color the color corresponding to the icon 80 selected by the user from the icons 80 arrayed in the color bar 51. The color layouts of the uniforms displayed in the window 54 are achieved by drawing onto a previously created template, and the user is able to select a desired color layout from the plurality of variations displayed in the window 54. The color layout selected here is the color design for the main uniform. An image of a character simulating a soccer player dressed in the main uniform is displayed in window 55.

If a user wishes to create a basic style for the uniform, himself of herself, then he or she can create a basic style by switching to basic style editing mode. The "basic style" referred to in the present specification indicates the main aspects of the design, such as the shape of the collar of the uniform, the length of the sleeves, and the like, and it does not include the color layout, such as the color scheme, or the like. If the basic style editing mode is selected, then the screen shown on the display 42 switches to a screen such as that illustrated in FIG. 6. In this diagram, 71 is a window for selecting the type of collar, 72 is a window for selecting the type of shirt, 73 is a window for selecting the type of shorts, and 74 is a window for selecting the type of socks. The user is able to select appropriately according to his or her wishes from the parts for the collar, shirt, shorts, socks, and the like, displayed on the respective windows 71–74. The image data for these parts is stored as parts data 18 in the read only memory, which is loaded when the system is started up, written to the work area 13 of the random access memory 10 and then used in the task of editing the basic style (see FIG. 1).

Provided that the color design of the home uniform has been determined, the color layout of the away uniform is designed automatically, and as shown in FIG. 7, a plurality of candidates are displayed in the window 67. Here, four design candidates are displayed. The design of the away uniform is determined by means of the user selecting a design which corresponds to his or her wishes from the design candidates displayed in the window 67. Here, the six color bars 61–66 displayed in the upper part of the screen show the combined patterns of the main color, second color and third color of the away uniform. A plurality of candidates for the main color, second color and third color of the away uniform are determined automatically at the stage that the main color, second color and third color of the home uniform are determined. A character wearing the away uniform selected by the user is displayed in the window 68.

Figure 3:
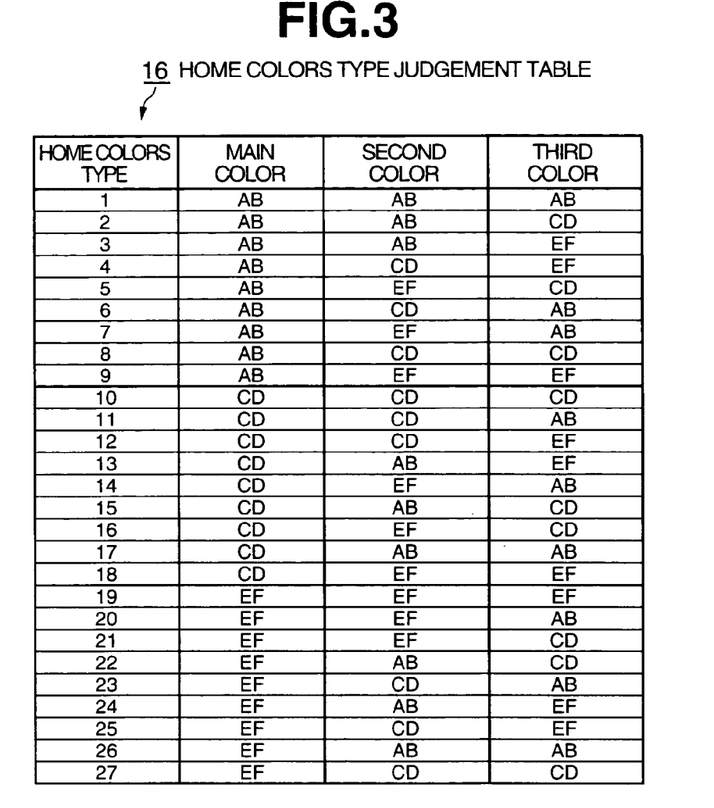
FIG. 3 is an illustrative diagram of a home colors type judgement table used in generating a color design according to the present embodiment.

Here, the procedure for determining the main color, second color and third color of the away uniform is described. As described previously, the input data 14 from the user, the color palette 15, the home colors type judgement table 16 and the away colors type judgement table 17 are written to the work area 13. The main CPU 30 determines a main color, second color and third color of the away uniform by using these data, and it automatically generates color layout candidates for the away uniform. FIG. 3 is an illustrative diagram of a home colors type judgement table 16. In this table, the "home colors type" signifies a combination of groups (color groups) to which the main color, second color and third color constituting the home colors belong, and 27 types are prepared, from type 1 to type 27. Here, an entry of "AB" in this table indicates that the group to which the color belongs is group A or group B, and more specifically, it indicates that the color is any one of colors C1 to C3 (see FIG. 5). This applies similarly to entries "CD" and "EF". Looking at the home colors type number 9, the color group to which the main color belongs is group A or group B, the color group to which the second color belongs is group E or group F, and the color group to which the third color belongs is group E or group F.

Figure 4:
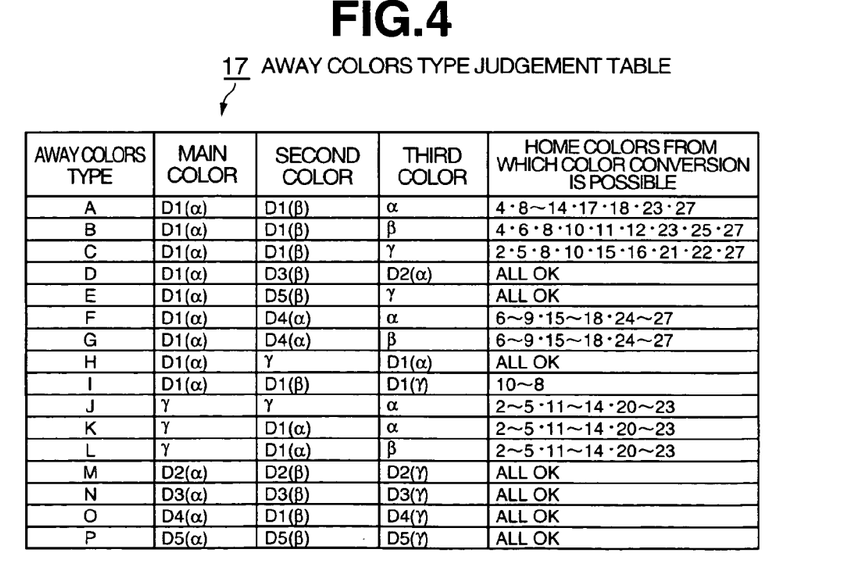
FIG. 4 is an illustrative diagram of an away colors type judgement table used in generating a color design according to the present embodiment.

FIG. 4 is an illustrative diagram of an away colors type judgement table 17. In this table, the "away colors type" signifies a combination of color groups to which the main color, second color and third color constituting the away colors belong, and 16 types are prepared from type A to type P. The away colors are generated by converting the home colors, in accordance with previously established color conversion rules. The combination of home colors which can be converted to away colors is previously determined, and in the example shown in FIG. 4, for instance, then the home colors types which can be converted to away colors of type A are types 4, 8 to 14, 17, 18, 23, and 27. The combination of home colors which can be converted to away colors is similarly limited with respect to type B to type P. Here, if the entry is "ALL OK", then this indicates that color conversion is possible with respect to all of the home colors types. For example, it is indicated that any of the home colors types can be converted to away colors in the case of types D, E, M, N, O and P. A concept is set for the respective away colors types, for example, type A–type E have a black and white base, type F and type G have black and white stripes, type H has a color layout wherein either the main color or third color is white and the other thereof is black, type I is a monotone composition, type J-type L has a color layout wherein the third color is taken to be the same as the main color, type M and type N have a brightness contrast composition, and type O and type P have a color contrast composition.

In this table, α, β, and γ respectively signify the main color, second color and third color which constitute the home colors. Furthermore, the five functions D1 to D5 indicate color conversion factors. These color conversion factors are factors provided in correspondence with a combination of a main color, a second color and a third color which constitute the home colors. The function D1(x) is known as a white/black judgement function, which adopts a white value if the color x belongs to group A to group D, and which adopts a black value if the color x belongs to group E or group F. In other words, this is a function which sets either white or black as an output value. In actual soccer competition, in many cases, the main color of the away uniform is white, and therefore, in the present embodiment also, it has been devised that the function D1(x) is used frequently as a color conversion function for the main color, in such a manner that white is used as a main color for the away uniform, in as many cases as possible. Function D2(x) is known as a brightness judgement function, which outputs an appropriate color selected at random from the colors belonging to group D or group E, if the color x belongs to any one of group A-group C, and which outputs an appropriate color selected at random from any one group A-group C if the color x belongs to group D or group E. In other words, it is a function which inverts the brightness. The function D3(x) is a function for converting the color in accordance with previously determined correspondence relationships, and if the color x belongs to group A, then a color selected at random from group F is output. Similarly, a color selected at random from group D is output if the color x belongs to group B, and respectively, a color from group E is output if x belongs to group C, a color from group B is output if x belongs to group D, a color from group C is output if x belongs to group D, and a color from group A or group B is output if x belongs to group F. In other words, the function D3(x) is one which sets a complementary color of the input value, color x, as the output value.

In the function D4(x), in order to perform color conversion, the twelve base colors are divided into two groups. The cold type of colors, C3, C7, C9, C8, C11 and C12, belong to the first group, and the warm type of colors, C1, C2, C4, C5, C6, C10, belong to the second group. If the function D4(x)judges that the color x belongs to the first group, it outputs a color selected at random from the second group (excluding color C1), whilst if it judges that the color x belongs to the second group, then it outputs a color selected at random from the first group (excluding color C12). In other words, the function D4(x) is one which converts mutually between cold type colors and warm type colors. In the function D5(x), in order to perform color conversion, the twelve base colors are divided into four groups. Colors C1 and C12 belong to the first group, colors C3, C9 and C11 belong to the second group, colors C2, C5, C6 and C10 belong to the third group, and colors C4, C7 and C8 belong to the fourth group. If it is judged that the color x belongs to the first group, then the function D5(x) randomly selects and outputs any color belonging to the second to fourth groups. Moreover, any color from the third group is randomly selected and output if the color x is judged to belong to the second group, and respectively, a color from the first group is output is x is judged to belong to the third group, and a color from the third group is output if x is judged to belong to the fourth group. The classification of groups, conversion rules, and the like, for the base colors used in the color conversion described above are merely examples, and the invention is not limited to these.

Here, the procedure for generating away colors from home colors will be described with reference to a concrete example. Supposing that the color composition of the home colors is red (main color), white (second color) and green (third color), then since the main color belongs to group C or group D, the second color belongs to group A or group B, and the third color belongs to group C or group D, then the home colors type is taken to be type 15 (see FIG. 6). The away colors types to which color conversion is possible from type 15 are the 11 types: type C, type D, type E, type F, type G, type H, type I, type M, type N, type O, and type P. For example, if the colors are converted to type D, then for the away colors, D1(red) will be selected as the main color, D3(white) will be selected as the second color, and D2(red) will be selected as the third color. Here, these colors will be D1 (red)=white, D3(white)=ultramarine (one color out of dark red, ultramarine, and black), D2(red)=yellow (one color out of cyan and yellow). Six of the eleven color types of away colors into which the colors are converted are selected at random, and a main color, second color and third color are displayed respectively in the color bars 61–66 shown in FIG. 4.

In this way, according to the present embodiment, by converting the away colors to complementary colors of the home colors, or inverting their brightness, or by converting mutually between warm type colors and cold type colors, it is possible to change the color concept of the away uniform with respect to the color concept of the home uniform, and hence a color design for a uniform creating a different impression can be achieved. Thereby, even if the uniform has a color design which is of the same type of colors as the uniform of the opposing team, since the home uniform colors and the away uniform colors are created on the basis of design concepts creating completely different impressions, it is possible clearly to distinguish between the two teams, visually, by changing the uniform of any one of the teams to a home or away uniform.

The foregoing description related to an example of the uniform of a player character appearing in a soccer game, but the present invention is not limited to this and it is also possible to adopt a composition wherein a color design for an emblem, team flag, or the like, can be generated automatically, in accordance with the color design of the uniform. In this case, the colors of the emblem, team flag, or the like, are desirably set to be colors of the same type as the uniform colors. Moreover, the present invention is not limited to a soccer game, and may also be used in other cases where a team is constituted by collecting together a plurality of players, and a game is played wherein the constituent members of opposing teams move around the field in a mixed fashion, such as rugby, basketball, ice hockey, lacrosse, or the like. Moreover, the present invention can be applied not only to sporting games requiring team play, but also to combat games in which characters fight against each other, or to role-playing games, or the like.

What is claimed is:

1. A computer program product wherein a computer program for causing a computer system to execute processing for generating a first color design and a second color design of character objects fighting with each other in a match game is recorded on a computer-readable recording medium;

wherein the computer program causes the computer system to execute the steps of:

an input step of receiving specification of at least two colors constituting the first color design for the character objects;

a step of determining the type of the first color design from a combination of the colors constituting the specified first color design, according to a first type determination table defining the type of the first color design;

a step of determining the type of the second color design from the determined type of the first color design according to a second type determination table defining the type of the second color design for the character objects;

a step of determining a plurality of color conversion rules based on the determined type of the second color design according to a color conversion rule determination table that determines an available color conversion rule from among a plurality of predetermined color conversion rules;

a step of converting the colors specified in said input step into other colors according to the plurality of predetermined color conversion rules and determining a plurality of combinations of colors constituting the second color design;

a step of generating a plurality of candidates for color layouts constituting the second color design for the character objects based on a color combination selected from among the determined plurality of combinations of colors constituting the second color design and displaying those candidates; and a step of determining the second color design for the character objects based on the specified candidates.

2. The computer program product according to claim 1, wherein said computer program receives specification of at least two or more colors in said input step, and performs color conversion for each of the specified colors in said converting step.

3. The computer program product according to claim 1, wherein said color conversion is achieved by means of color conversion functions associated with the combination of colors specified in said input step.

4. The computer program product according to claim 3, wherein said color conversion functions comprise a function for outputting, as colors constituting the color design for a second one of the character objects, colors having a complementary color relationship with respect to the colors constituting the color design for a first one of the character objects.

5. The computer program product according to claim 3, wherein said color conversion functions comprise a function for outputting cold type colors as colors constituting the color design for a second one of the character objects if the colors constituting the color design for a first one of the character objects are warm type colors, and for outputting warm type colors as colors constituting the color design for the second one of the character objects if the colors constituting the color design for the first one of the character objects are cold type colors.

6. The computer program product according to claim 3, wherein said color conversion functions comprise a function for outputting, as colors constituting the color design for a second one of the character objects, colors having inverted brightness of the colors constituting the color design for a first one of the character objects.

7. The computer program product according to claim 1, wherein the character objects include a first character object and a second character object, and wherein said computer program further causes said computer system to execute:

a step of automatically generating a plurality of types of candidates for color layout constituting the color design for the second character object, and displaying same on a screen; and a step of determining a color layout constituting the color design for the second character object on the basis of specified one of said candidates.

8. The computer program product according to claim 1, wherein said computer program further causes said computer system to execute:

a step of determining a color layout for an object to be displayed in association with a first one of the character objects, on the basis of colors of the same type as the colors constituting the color design of said first one of the character objects; and a step of displaying said first character object on a screen.

9. A computer system comprising:

the computer program product according to claim 1;

a CPU for executing the computer program stored on the computer program product; and an image generating device for displaying on a display, on the basis of color designs for first and second ones of the character objects generated by said CPU.

10. A network server comprising delivery means for providing on-demand delivery, via a computer network, of the computer program stored on the computer program product according to claim 1, in response to a request from a client device.

* * * * *